US009369231B2

(12) United States Patent
Brown et al.

(10) Patent No.: US 9,369,231 B2
(45) Date of Patent: Jun. 14, 2016

(54) DYNAMIC ADJUSTMENT OF TRANSFER CHARACTERISTICS AS A FUNCTION OF CHANNEL CHARACTERISTICS

(75) Inventors: Kevin Brown, Long Beach, CA (US); Scott R. Powell, Irvine, CA (US); Gottfried Ungerboeck, Langnau a.A. (CH)

(73) Assignee: Broadcom Corporation, Irvine, CA (US)

( * ) Notice: Subject to any disclaimer, the term of this patent is extended or adjusted under 35 U.S.C. 154(b) by 563 days.

(21) Appl. No.: 11/330,324

(22) Filed: Jan. 12, 2006

(65) Prior Publication Data

US 2006/0153307 A1 Jul. 13, 2006

Related U.S. Application Data

(60) Provisional application No. 60/643,308, filed on Jan. 13, 2005.

(51) Int. Cl.
| | |
|---|---|
| *H04B 3/00* | (2006.01) |
| *H04L 1/00* | (2006.01) |
| *H04L 1/24* | (2006.01) |
| *H01R 9/03* | (2006.01) |
| *H04L 25/02* | (2006.01) |

(52) U.S. Cl.
CPC .............. *H04L 1/0002* (2013.01); *H04L 1/24* (2013.01); *H01R 9/035* (2013.01); *H01R 2201/04* (2013.01); *H04L 25/0264* (2013.01)

(58) Field of Classification Search
CPC ..... H04L 1/0002; H04L 1/24; H04L 25/0264; H01R 2201/04; H01R 9/035
USPC ........................................................ 375/257
See application file for complete search history.

(56) References Cited

U.S. PATENT DOCUMENTS

| | | | | |
|---|---|---|---|---|
| 5,966,056 | A * | 10/1999 | Thornton | 333/5 |
| 6,317,495 | B1 * | 11/2001 | Gaikwad et al. | 379/417 |
| 2002/0163974 | A1 * | 11/2002 | Friedman | 375/295 |
| 2005/0123028 | A1 * | 6/2005 | Cioffi et al. | 375/222 |

OTHER PUBLICATIONS

Song, "Dynamic spectrum management for next-generation DSL systems", IEEE Communications Magazine, Publication Date: Oct. 2002, vol. 40, Issue: 10 on pp. 101-109.*

(Continued)

*Primary Examiner* — Juan A Torres
(74) *Attorney, Agent, or Firm* — Sterne, Kessler, Goldstein & Fox PLLC

(57) ABSTRACT

A method, system and computer program product to adjust transfer rates on conductors in a multi-conductor cable comprising monitoring signals received on each conductor, determining a Signal to Noise Ratio (SNR) for each conductor and adjusting a transfer rate on one or more conductors based on the corresponding SNR. In an embodiment the multi-conductor cable is a twisted pair Ethernet cable. The method further comprises determining whether a conductor is transmitting at an optimal transfer rate as a function of its SNR, calculating an optimal transfer rate for each conductor as a function of its SNR and periodically measuring a change in SNR on each conductor. If the change in SNR is greater than a predetermined threshold, then the transfer rate is re-calculated for the conductors requiring transfer rate adjustment as a function of SNR.

24 Claims, 15 Drawing Sheets

(56) References Cited

OTHER PUBLICATIONS

Haratsch, "High-speed VLSI implementation of reduced complexity sequence estimation algorithms with application to Gigabit Ethernet 1000Base-T", VLSI Technology, Systems, and Applications, 1999. International Symposium on Jun. 8-10, 1999 pp. 171-174.*

ITU G.992.1 "Asymmetric digital subscriber line (ADSL) transceivers" This ADSL standard can be found at http://www.itu.int/rec/T-REC-G.992.1-199907-I/en.*

ITU G.992.1 standard "Asymmetric digital subscriber line (ADSL) transceiver", ITU Jun. 1999.*

* cited by examiner

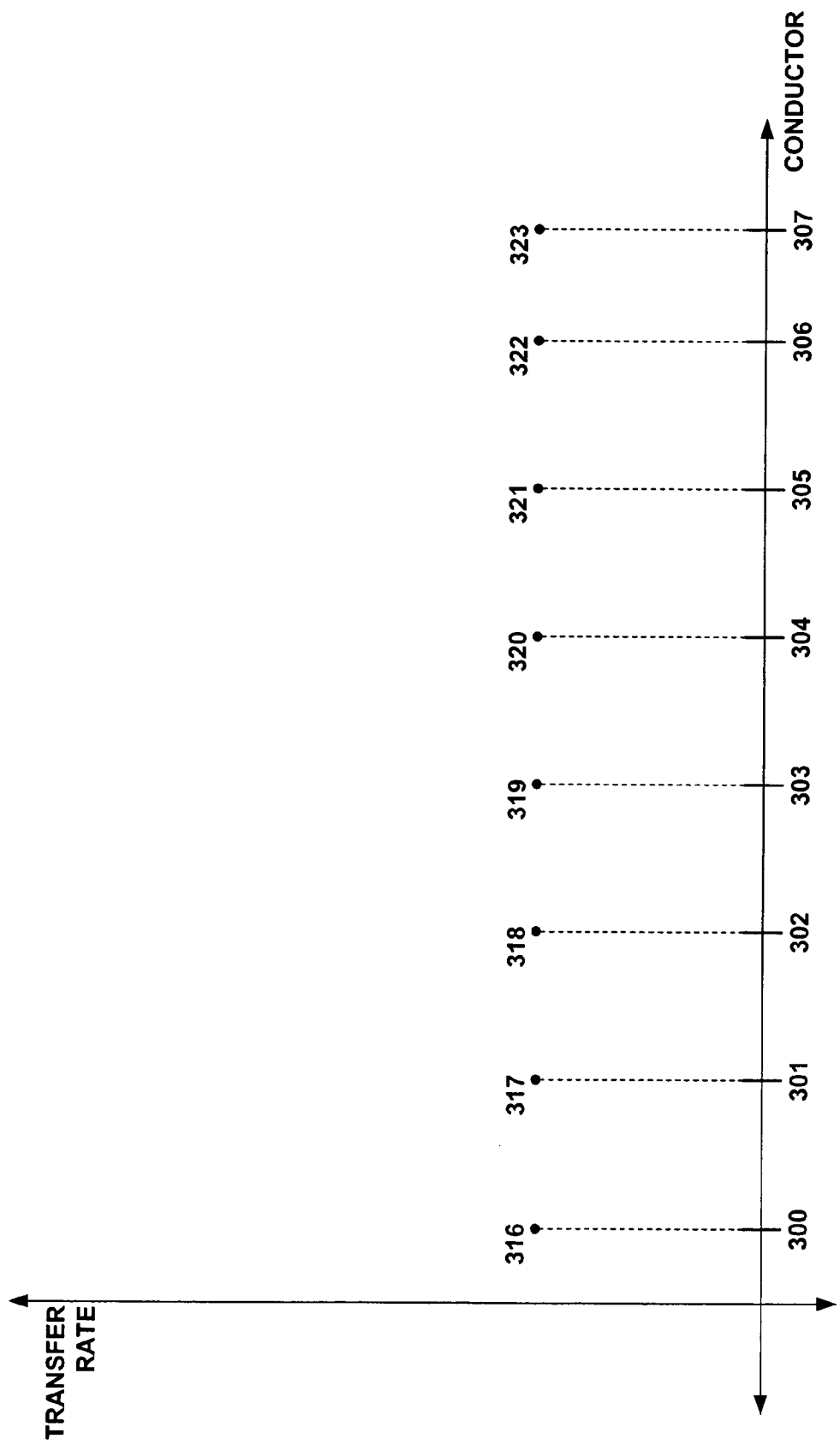

DYNAMIC ADJUSTMENT OF TRANSFER CHARACTERISTICS AS A FUNCTION OF CHANNEL CHARACTERISTICS

CROSS-REFERENCE TO RELATED APPLICATION

This application claims the benefit of U.S. Provisional Application No. 60/643,308 filed Jan. 13, 2005, which is incorporated herein by reference.

FIELD OF THE INVENTION

This invention generally relates to data transmissions using communication systems and more specifically to dynamically adjusting data transmission characteristics.

BACKGROUND ART

As the density of devices in enterprise networks and data centers increases, low-cost Ethernet over twisted-pair cabling with Gigabit transfer rate has been incorporated in the 802.3 standard. To run multi-gigabit data rates on four-pair copper cabling, sophisticated signal processing is used to eliminate the effects of cross-talk between pairs of cable and to remove the effects of signal reflections. But it is difficult to eliminate noise that is external to the cable, such as electromagnetic interference (EMI) from outside sources or adjacent cables. Cable-to-cable noise, known as alien cross-talk, is a primary impediment to reliable data transmission over long cables. For example, to support distances of 330 feet, substantial augmentation to the existing cabling specifications are required.

In a multi-conductor cable, a single high rate data stream is often transmitted as multiple parallel lower rate data streams between transceivers on either side of a communication channel. For example, Gigabit Ethernet is defined for transmission over a multi-conductor cable comprising four individual twisted pairs of wires where each twisted pair operates at one-fourth of the overall symbol rate necessary to support gigabit traffic.

Cables are often constructed with multiple parallel transmission paths. For example, data cables are typically constructed with four twisted-pairs conductors capable of carrying four independent data streams. Such a cable is often referred to as a multi-conductor cable. In a multi-conductor transmission, the overall data rate is the sum of the data rates transmitted over each individual conductor. In Ethernet physical layers, the data rate on each conductor is identical. However, the maximum individual data rate that can be supported on a given conductor depends on the signal-to-noise ratio (SNR) of that single conductor's channel. If one conductor's channel has significantly lower SNR than others, the data rate on the higher SNR conductor channels will be lower than what these channels could otherwise support. Thus the available capacity is not efficiently utilized. Other standards such as IEEE 1394 and Fibre Channel also fail to utilize the full available capacity in multi-conductor cables.

What is needed is a method to optimize transfer rates in systems having multi-conductor cables.

BRIEF SUMMARY OF THE INVENTION

The invention comprises a method to adjust transfer rates on conductors in a multi-conductor cable comprising monitoring signals received on each conductor, determining a SNR for each conductor and adjusting a transfer rate on one or more conductors based on the corresponding SNR. In an embodiment the multi-conductor cable is a twisted pair Ethernet cable. The method further comprises determining whether a conductor is transmitting at an optimal transfer rate as a function of its SNR, calculating an optimal transfer rate for each conductor as a function of its SNR and periodically measuring a change in SNR on each conductor. If the change in SNR is greater than a predetermined threshold, then the transfer rate is re-calculated for the conductors requiring transfer rate adjustment as a function of SNR.

In an embodiment a system to adjust transfer rates on conductors in a multi-conductor cable comprises a receiver module configured to receive signals from the multi-conductor cable, a channel sensor module coupled to the receiver module and configured to determine a SNR for each conductor in the multi-conductor cable, a transfer characteristics adjuster module coupled to the channel sensor module and configured to calculate an optimal transfer rate for each conductor as a function of SNR for that conductor; a transmitter module coupled to the transfer characteristics adjuster module and configured to transmit signals at a rate calculated by the transfer characteristics adjuster module where the transfer characteristics adjuster dynamically adjusts a transfer rate of each conductor as a function of SNR of that conductor.

In an embodiment, a multi-conductor cable is provided comprising a plurality of conductors operating in conjunction with each other to carry data, each of the plurality of conductors having a corresponding channel characteristic where a transfer rate of each of the plurality of conductors is based on the corresponding channel characteristic.

Additional features and advantages of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed. The detailed description is not intended to limit the scope of the claimed invention in any way.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings:

FIG. 3B illustrates example transmission rates as a function of SNR for conductors in a multi-conductor cable according to a conventional transmission system.

Figure 1A:
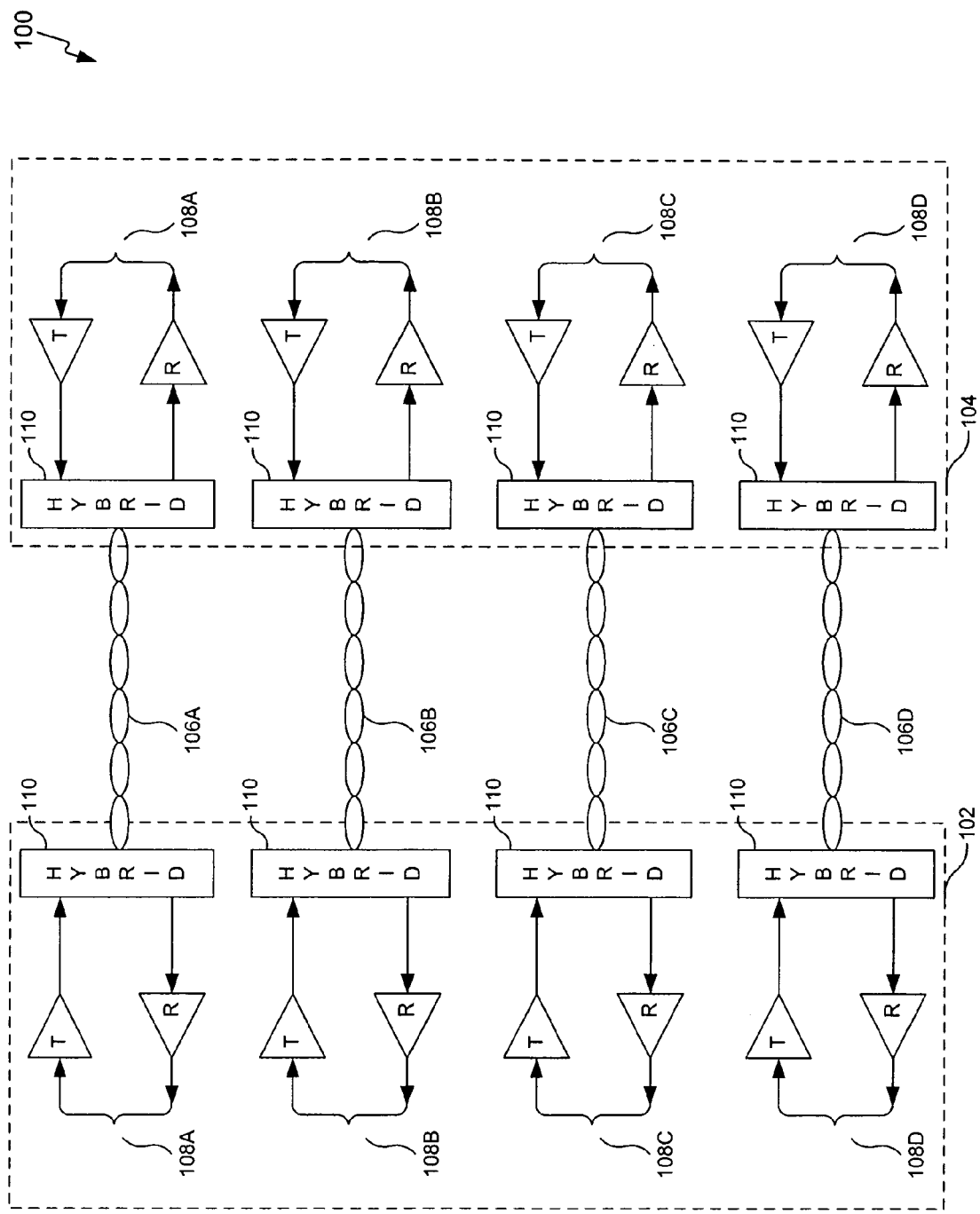
FIG. 1A illustrates an example bi-directional communication system according to an embodiment of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Table of Contents

I. Overview
II. Terminology
III. Example Embodiments
IV. Example Environment
V. Alternate Embodiments
VI. Conclusion

OVERVIEW

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The present invention will be described in terms of several embodiments applicable to transmission on Ethernet networks using twisted pair conductors as a physical medium. It will be understood that the essential concepts of dynamic adjustment of transfer characteristics as a function of channel characteristics disclosed herein are applicable to a wide range of network designs and protocols and can be applied to other technologies such as wireless LAN, computer architecture, radio frequency communications and similar systems that involve transmission on wired or wireless media. Thus, although the invention will be disclosed and described using Ethernet networks and twisted pair cables as examples, the scope of the invention is not in any way limited to Ethernet networks or twisted pair media.

TERMINOLOGY

"Transfer rate" usually refers to the transmission speed of a communications or computer channel. Transfer rates are measured in bits or bytes per second. "Data transfer rate" refers to the transmission speed of data on a communications or computer channel. Transfer rate is often more than the data transfer rate because control signals and redundant information for error correction may be sent along with data, which decreases the rate of actual data being sent. The transfer rate is usually a function of the system bandwidth and the signal-to-noise (SNR) characteristics. Although the invention will be described in terms of adjusting the transfer rate it is obvious to a person skilled in the relevant art(s) that it is also applicable to the data transfer rate.

"Bandwidth" is the transmission capacity of an electronic pathway such as a communications line, computer bus or computer channel. It is a measure of how much information can be conveyed across the channel in a unit of time. In a digital line, it is measured in bits per second (bps) or bytes per second (BPS) such as 1 Gigabit per second (1 Gbps) or 1 Megabyte per second (1 MBPS). In an analog channel or in a digital channel that is enveloped by a carrier frequency, bandwidth is the difference between the highest and lowest frequencies and is measured in Hertz (kHz, MHz, GHz).

"Channel characteristics" usually refers to the characteristic properties of a communications channel. These channel characteristics may include but are not limited to SNR, overall bandwidth, reliability of transferring information across a channel commonly measured in terms of bit error rate etc.

"Transfer characteristics" refers to those intrinsic parameters of a system, subsystem, or equipment which, when applied to the input of the system, subsystem, or equipment, will fully describe its output. For example in a communications system modifying intrinsic parameters for symbol size and symbol rate will result in a change in the transfer rate. Similarly, a change in modulation parameters will result in a change in the modulation frequency thereby altering the transfer rate. Although the invention will be described in terms of adjusting the transfer rate, it is not the only transfer characteristic that may be modified.

EXAMPLE EMBODIMENTS

An embodiment of the present invention is directed to a system and method for customizing the data rate for each conductor pair in a multiple conductor pair communication system. The system and method described herein could be used in any communication system having a physical layer with multiple conductor pairs. In an example, the system and method described herein can be used with communication systems supporting a 1 GBPS or 10 GBPS data rate. Embodiments of the present invention are not limited to any data rates or communication standard.

In a multi-conductor pair communication system, the overall data rate is the sum of the data rates transmitted over each individual conductor. In conventional physical layers of communication systems, the data rate on each conductor pair is identical. These conventional approaches have assumed that characteristics of each conductor pair are identical. However, one or more characteristics of each conductor pair can differ significantly.

FIG. 1A depicts an exemplary bidirectional communication system having multiple conductor pairs in which the method of customized data rate distribution across pairs of a multi-conductor pair cable may be implemented. FIG. 1A depicts an architecture having four conductors 106A-D. However, the invention is not limited to this embodiment and could be implemented with any number of conductor pairs.

Communications system 100 includes two transceivers 102 and 104 coupled together with multiple conductors pairs 106A-D. In an embodiment, each of conductor pair 106A-D is a balanced twisted wire pair. However, the invention is not limited to twisted pairs and could use other types of transmission line connections between transceiver 102 and transceiver 104.

Each transceiver 102, 104 includes 4 transmitter/receiver pairs 108A-D, one per each of conductor pair 106A-D. Each of transmitter/receiver pairs 108A-D is coupled to a hybrid block 110. Hybrid block 110 ensures that receivers in each of transmitter/receiver pairs 108A-D do not see what is simultaneously transmitted over each of the four channels in full-duplex mode. In other words, hybrid block 110 separates the transmit signal from the receive signal.

In an embodiment, each transceiver has one or more modules (not shown) for customizing the data rate for each of conductor pairs 106A-D. For example, a single module could customize the data rate for all conductor pairs. Alternatively, multiple modules could be used. The module includes functionality to determine one or more characteristics associated with a conductor pair, to determine the optimal data rate for each conductor pair based upon the determined characteristic(s), and to adjust the data rate, if needed, for the conductor. The module may be a processor (not shown) or a control system (not shown) coupled to any of transmitter/receiver pairs 108A-D.

If the SNR for a specific conductor (or pair of conductors) is zero, then data may not be transmitted on that conductor(s). For example, if one pair of an Ethernet cable is broken, the SNR for that conductor is zero since no signal can be transmitted on that pair. The transceivers 102 and 104 can then communicate using the remaining three pairs by adjusting the data rate on the three pairs accordingly. In one example, data rates may be adjusted to transmit at a rate of 1 Gbps or higher on less than the standard four pairs. A system may transmit up to 1 Gbps using only one pair if three pairs are broken or have an SNR of 0. It is common for an Ethernet cable to have one broken or mis-wired pair. It is also common for users to take a four pair Ethernet cable and split the ends into two 2-pair cables. Some technologies allow for 100 Mbps transmissions over 2-pair cables and therefore data rates can be adjusted accordingly.

For example, in FIG. 1A, conductor pair 106A may have a lower SNR than the SNR of conductor pairs 106B-D. The transceiver may adjust the data rates of each conductor pair to exploit this SNR difference between conductor pairs by transmitting at different rates on one or more conductor pairs. For example, to achieve a 10 Gbps overall data rate, conductor pairs 106B-D may transmit at 3 Gbps while conductor pair 106A (the "low SNR" conductor pair) transmits at 1 Gbps.

Figure 1B:
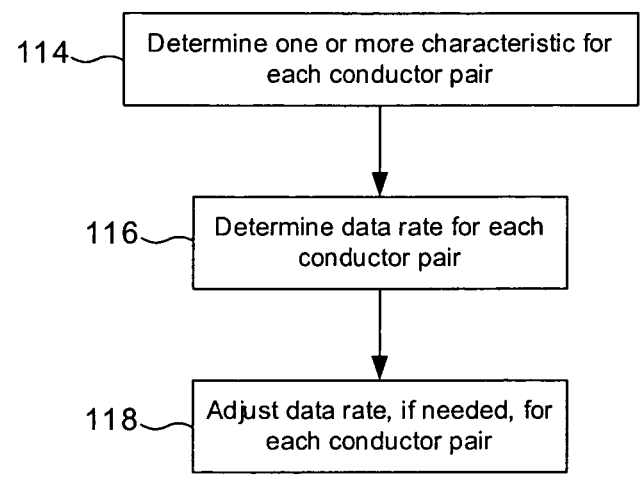
FIG. 1B illustrates a flowchart showing example steps to customize data rate distribution across pairs of a multi-conductor pair cable, according to an embodiment of the invention.

FIG. 1B illustrates a flowchart of an exemplary method to customize data rate distribution across pairs of a multi-conductor pair cable, according to an embodiment of the present invention.

In step 114, one or more characteristics for each conductor pair are determined. In an embodiment, the characteristic(s) are indicative of signal-to-noise ratio (SNR). The one or more characteristics of each conductor pair can be directly measured. For example, the transceiver may directly measure the noise on each conductor pair. Example operation of step 114 is described in further detail below with reference to the flowcharts in FIG. 1C and FIG. 1D. As would be appreciated by persons of skill in the art, one or more characteristics indicative of other transceiver parameters could be determined in the present invention.

In step 116, a preferred or optimal data rate for each conductor is determined based on the measured characteristic(s). In an embodiment, the data rates are pre-determined based on the measured characteristics determined in step 114. As a result of step 116, the conductor pairs may be determined to have an unequal data rate distribution. For example, each conductor pair may have a different data rate. Alternatively, one or more conductors may have the same data rate. Example operation of step 116 is described in further detail below with reference to the flowchart in FIG. 1E.

In step 118, the data rate of one or more conductor pairs is adjusted, if needed. Based on the results of step 116, the transceiver determines whether the data rate for a conductor pair needs to be adjusted and if so, adjusts the data rate accordingly to substantially match the data rate determined in step 116. Various methods exist for adjusting the data rate of a conductor pair. For example, the data rate can be updated by adjusting the symbol rate, the symbol size, or some combination of both. Example operation of step 118 is described in further detail below with reference to the flowchart in FIG. 1F.

Figure 1C:
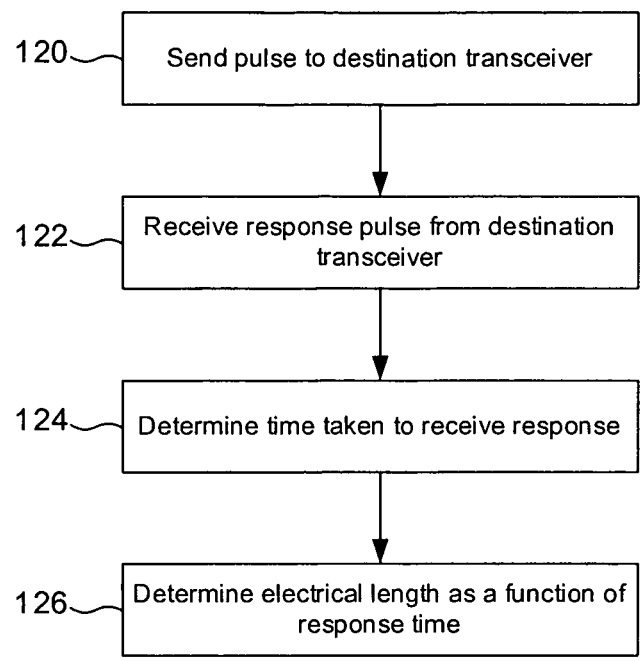
FIG. 1C illustrates a flowchart illustrating an example operation of step 114 of the flowchart illustrated in FIG. 1B according to an embodiment of the invention.

FIG. 1C illustrates a flowchart illustrating an example operation of step 114 of the flowchart illustrated in FIG. 1B. In an embodiment using twisted pair conductors, the electrical length of the conductor pair is determined. The electrical length is related to the signal-to-noise ratio.

In step 120, a source transceiver sends a pulse to a destination transceiver. The pulse may be a rapid change in a characteristic of a signal, e.g., phase or frequency, from a baseline value to a higher or lower value, followed by a rapid return to the baseline value.

In step 122, the source transceiver receives a response pulse from the destination transceiver.

In step 124, the source transceiver determines the time lag between sending a pulse to the destination transceiver and receiving the response pulse from the destination transceiver.

In step 126, the source transceiver determines the electrical length of the transmission medium based on the time measured in step 124 and the rate of the pulse sent and the rate of the response pulse received. As would be appreciated by persons of skill in the art, other methods for determining electrical length of the transmission medium could be used.

Figure 1D:
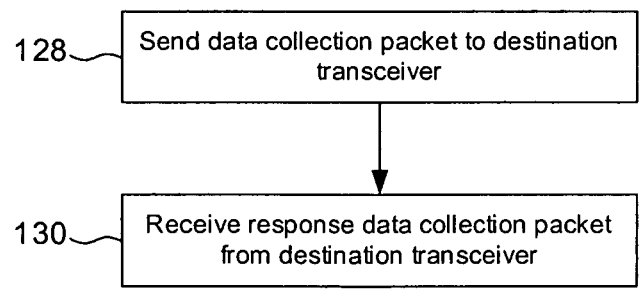
FIG. 1D illustrates a flowchart illustrating an alternate example operation of step 114 of the flowchart illustrated in FIG. 1B according to an embodiment of the invention.

FIG. 1D shows a flowchart illustrating an alternate example operation of step 114 of the flowchart illustrated in FIG. 1B. In an embodiment, a data collection packet may be used to gather information about channel characteristics between a source transceiver and a destination transceiver. The channel characteristics may be one or more of SNR, available bandwidth, bit-error-rate (BER) etc.

In step 128, a data collection packet is sent by the source transceiver to the destination transceiver. The data collection packet may be modified by transceivers or routers along the route to the destination transceiver with channel characteristic information for each individual segment of the transmission line.

In step 130, the source transceiver receives a response data collection packet from the destination transceiver. The response data collection packet includes data collected by the data collection packet and is further modified by the destination transceiver with information regarding channel characteristics at the destination transceiver.

Figure 1E:
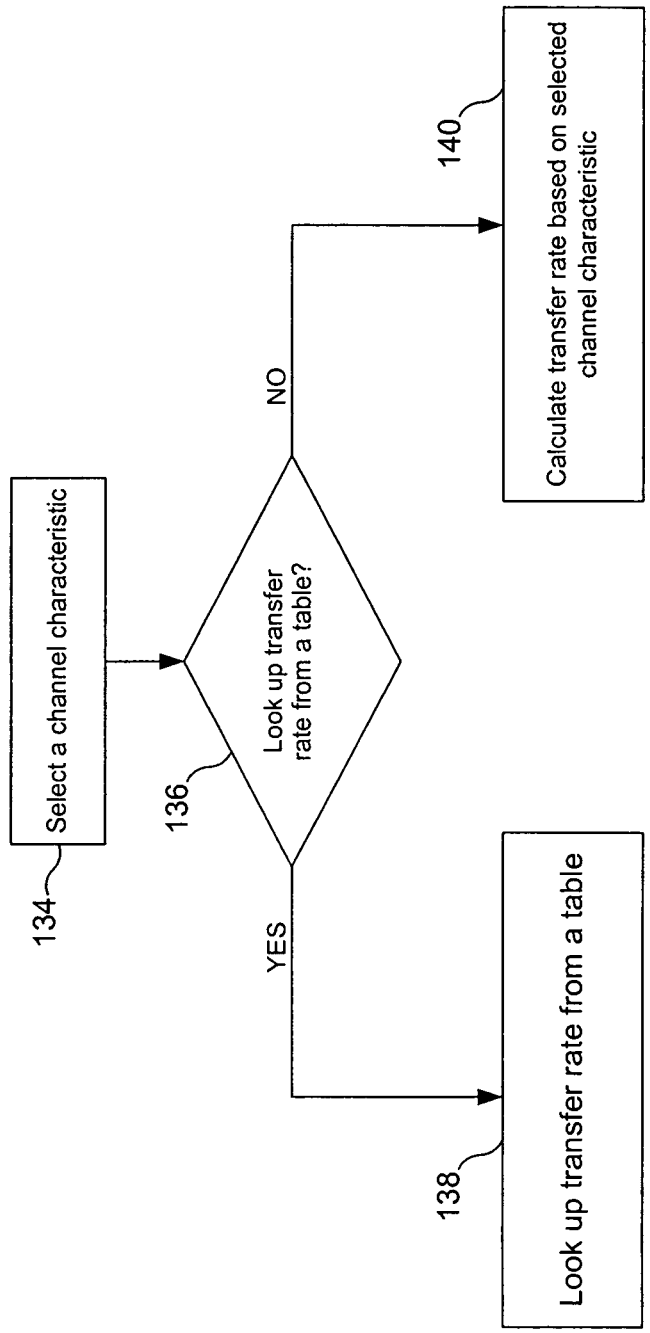
FIG. 1E illustrates a flowchart illustrating an example operation of step 116 of the flowchart illustrated in FIG. 1B according to an embodiment of the invention.

FIG. 1E shows a flowchart with example operation of step 116 of the flowchart illustrated in FIG. 1B. In this embodiment, a characteristic (e.g., SNR) may be associated with a data rate (e.g., in a table, etc.) or the data rate may be calculated. The transceiver then determines the data rate by using the measured characteristic. For example, a conductor pair having a "peak" noise may always be assigned data rate A and a conductor pair having an "average" noise may always be assigned data rate B. Alternatively, data rates can be optimized in real-time for each conductor pair.

In step 134, the source transceiver selects a channel characteristic if more than one channel characteristic was determined in step 114. For example, the source transceiver may select one of SNR, BER, available bandwidth etc.

In step 136, the source transceiver determines whether to look up a pre-determined table of the channel characteristic (selected in step 134) and data rate associations for each conductor pair or to calculate the data rate for each conductor pair based on the channel characteristic selected in step 134.

In step 138, if the source transceiver selects to look up the data rate in step 136, the source transceiver looks up a data rate, as a function of the channel characteristic selected in step 134, for each conductor pair in the table of predetermined channel characteristic and data rate associations.

In step 140, if the source transceiver selected to calculate the data rate in step 136, the source transceiver calculates the data rate for each conductor based on the channel characteristic selected in step 134. The data rate may be calculated based on a predetermined formula for the channel characteristic determined in step 134.

Figure 1F:
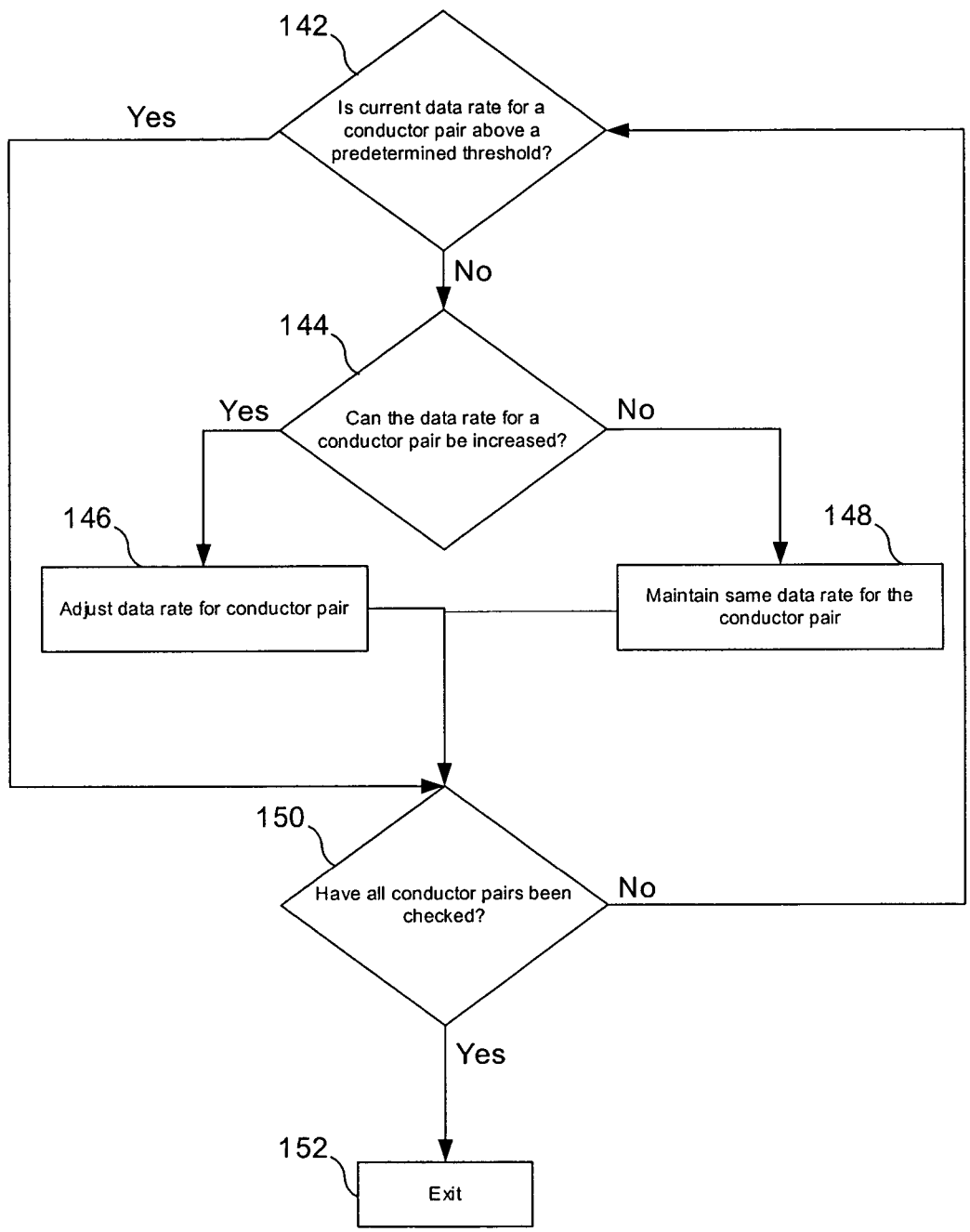
FIG. 1F illustrates a flowchart illustrating an example operation of step 118 of the flowchart illustrated in FIG. 1B according to an embodiment of the invention.

FIG. 1F shows a flowchart illustrating an example operation of step 118 of the flowchart illustrated in FIG. 1B.

In step 142, it is determined if the current data transfer rate for a conductor pair is above a predetermined threshold. For example, if the conductor pair has a manufacturer prescribed data transmission rate, then this may be the predetermined threshold.

In step 150, if the current data transfer rate for a conductor pair is determined to be at or above the predetermined threshold in step 142, it is determined whether the data transfer rate for all conductor pairs has been checked. For example, in Ethernet systems using four twisted pairs, the data rate for each of the four pairs needs to be checked.

In step 144, if the current data transfer rate for a conductor pair is determined to be below the predetermined threshold in step 142, the transceiver determines whether the data transfer rate can be increased based on the data transfer rate determined in step 116. Since the data transfer rate determined in step 116 is a function of the channel characteristics, in another example, the transceiver determines whether the data transfer rate can be increased based on the channel characteristics measured in step 114.

In step 146, if it is determined that the data transfer rate for a conductor pair can be increased based on the data transfer rate determined for that conductor pair in step 116, then the data transfer rate for the conductor pair is adjusted to substantially equal the value determined in step 116. In an example, the transceiver may increase or decrease the data rate depending upon the data rate determined for the conductor pair in step 116. Control passes to step 150.

In step 148, if it is determined that the data transfer rate for a conductor pair cannot be increased based on the data transfer rate determined for that conductor pair in step 116, the transceiver maintains the same data rate for that conductor pair. Control passes to step 150.

In step 150, it is determined if the data transfer rate for all conductor pairs has been checked. If the data transfer rate for all conductor pairs has been checked then control passes to step 152 where the algorithm exits. If the data transfer rate for all conductor pairs has not been checked then the transceiver selects the next conductor pair to be checked and control passes to step 142.

Below is a more detailed description of the example environment for the present invention along with alternate embodiments.

EXAMPLE ENVIRONMENT

Ethernet is a LAN technology that transmits information between data terminal equipment (DTE) which meet the standards specified by the IEEE 802.3 standard. DTEs usually refer to devices that are either the source or the destination of data frames. DTEs are typically devices such as PCs, workstations, file servers, or print servers that, as a group, are all often referred to as end stations. Computers are referred to as DTEs if they meet the IEEE 802.3 transmission standards. This usually implies that the computers are equipped with a network card which conforms to the necessary IEEE 802.3 protocols. A majority of computer vendors provide equipment with Ethernet attachments, making it possible to link computers with an Ethernet LAN. The Ethernet specification defines wiring and signaling for the physical layer, and frame formats and protocols for the media access control (MAC) or data link layer of the Open Systems Interconnect (OSI) model.

A 10/100 Ethernet port supports two speeds: 10 Mbps (10BaseT) and 100 Mbps (100BaseT). Computers also come with 10/100/1000 ports, which adds Gigabit Ethernet at one gigabit per second (1000 Mbps). Gigabit Ethernet is commonly used as a high-speed link between switches and servers. Ethernet may be wired in a star configuration using a hub or switch. Hubs, which predated switches, are shared media devices. All stations attached to the hub share the total bandwidth. Switches provide each sender and receiver pair with the full bandwidth and are significantly faster than hubs. Like the client machines, Ethernet switches and hubs also support 10/100 and 10/100/1000 speeds but are not limited to these speeds.

Ethernet may also use economical twisted pair cables and RJ-45 connectors. Sometimes, spare telephone wires in a building may be used, but often only at lower speeds. To extend distances, fiber-optic cable may also be used. The first versions of Ethernet such as 10Base5 and 10Base2 used coaxial cables.

Figure 2A:
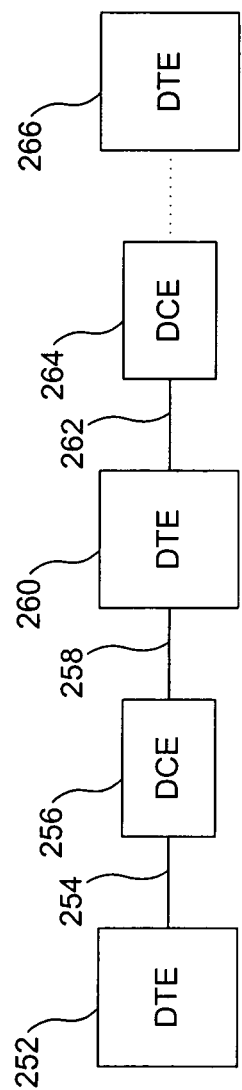
FIG. 2A illustrates an example Ethernet network.

FIG. 2A illustrates an example Ethernet network comprising DTEs 252, 260, 266, Ethernet link segments 254, 258, 262 and Data Communication Equipment (DCE) 256 and 264. DTEs 252, 260, 266, segments 254, 258, 262 and DCEs 256 and 264 are shown by way of example and do not limit the invention. Furthermore, a network may include multiple DTEs (not shown) besides DTEs 252, 260, 266, multiple DCEs (not shown) besides DCEs 256, and 264 and multiple segments (not shown) besides segments 254, 258 and 262.

DCEs 256 and 264 include but are not limited to standalone devices such as repeaters, network switches, hubs, bridges and routers, or communications interface units such as interface cards and wired or wireless modems and communication towers. Throughout the specification, standalone intermediate network devices will be referred to as either intermediate nodes or DCEs. Segments 254, 258, 262 are the physical media such as wires or fibre optic cables used to carry Ethernet signals between DTEs 252, 260, 266 etc. and DCEs 256, 264 etc. Segments 254, 258, 262 etc. could be any one of several Ethernet media types, including but not limited to thick or thin coaxial cable, twisted-pair cable, fiber optic cable or any combination thereof. The IEEE standard requires that individual segments be connected together with Ethernet DCEs 256, 264 etc over certain lengths as a function of the physical media employed. In embodiments segments may be wireless signals between DTEs 252, 260, 266 etc., DCEs 256, 264 etc. or transmission towers.

DCEs 256, 264 etc. function as intermediate network devices that receive and forward frames across the network. DCEs 256, 264 etc. are used to connect Ethernet segments 254, 258, 262 etc. As segments 254, 258, 262 etc. exceed their maximum number of nodes or maximum length, signal quality begins to deteriorate. DCEs 256, 264 etc. may provide the signal amplification and re-timing required to connect individual segments. DCEs 256, 264 etc. may also have circuits that ensure that collisions that occur on any segment are propagated onto all other segments to which a DCE 256, 264 etc. is attached.

By propagating information about collisions on a segment onto all other segments a DCE 256, 264 etc. makes all segments function as though they were a single segment. This makes it possible for DTEs 252, 260, 266 etc., attached to any segment in a system of Ethernet segments linked with DCEs 256, 264 etc. to receive the same signals and to operate as a single LAN. DTEs 260 etc. and DCEs 256, 264, etc. between source DTE 252 and destination DTE 266 may be configured in a variety of configurations. Multiple DCEs 256, 264 etc. may be connected together without intermediate DTEs 260 etc. and similarly multiple DTEs 260 etc. may be chained together without intermediate DCEs 256, 264 etc. depending upon the distance between consecutive DTEs 260 etc. Common components of DTEs 252, 260, 266 etc. are described below in further detail.

Figure 2B:
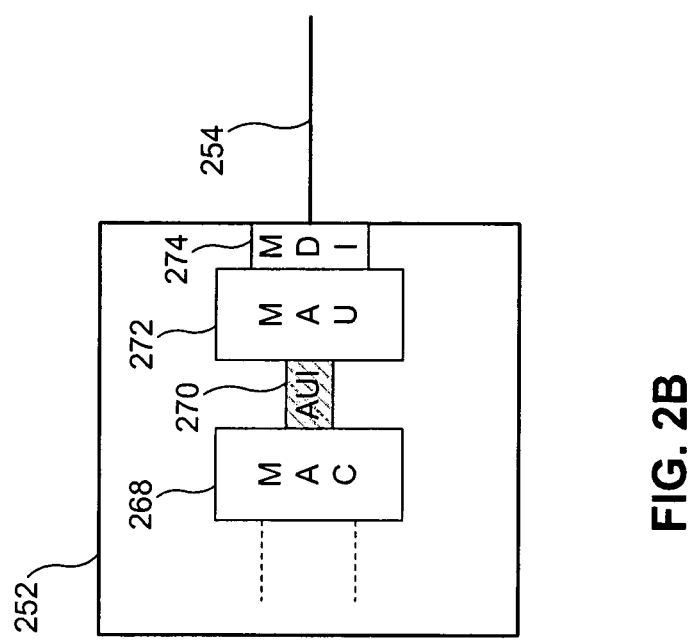
FIG. 2B illustrates an example Data Terminal Equipment (DTE).

FIG. 2B illustrates a DTE e.g. DTE 252 in further detail. In an embodiment, DTE 252 comprises a medium dependent interface (MDI) 274, a medium attachment unit (MAU) 272, an attachment unit interface (AULI) 270 and a Media Access Control (MAC) or Ethernet interface 268.

MAC interface 268 performs the necessary MAC layer functions that control access to physical medium 254. AUI 270 is typically a 15-pin transceiver cable that provides a path between MAC interface 268 and MAU 272. MAU 272 is commonly known as a transceiver since it both transmits and receives signals on the physical medium 254. MDI 274 may be a part of the MAU 272 and provides MAU 272 with a direct physical and electrical connection to the physical medium 254. Segment 254 is connected to MDI 274 which typically conforms to the part of the IEEE 802.3 standard that specifies requirements for the piece of hardware used for making a direct physical and electrical connection to the physical medium which in this example is segment 254. In the case of thick Ethernet, MDI 274 is typically a clamp that is installed directly onto physical medium 254 which is a coaxial cable. For Ethernet using twisted pair physical media 254, MDI 274 is an RJ-45 jack that provides a connection to the four twisted-pair wires used to carry network signals in the twisted-pair media system.

MAU 272 is coupled to a transceiver cable AUI 270 which provides a path for signals and power carried between the Ethernet interface 268 and the MAU 272. The AUI 270 may be connected to the Ethernet interface 268 with a 15-pin connector.

MAC interface 268 may be directly coupled to MAU 272 without AUI 270. DTE 252 may also include other components coupled to MAC interface 268. For example, a data bus may connect MAC interface 268 to main memory to enable data transfer over the network.

The channel characteristics of the transmission medium and speed at which MAU 272 transmits and receives signals is a function of physical media 254, MDI 274, and AUI 270 among other factors described below. Multi-conductor twisted pair wires where each multi-conductor cable has eight conductors or four twisted pairs is commonly used physical media in Ethernet transmissions and is described in further detail below.

FIGS. 2C-2H illustrate the types of twisted pair physical media that may be used in Ethernet networks. Twisted pair cabling is a common form of wiring in which two conductors are wound around each other. Usually, in each twisted pair one conductor may transmit while the other conductor may receive. In some cases, each conductor in a twisted pair may only transmit or receive.

Figure 2E:
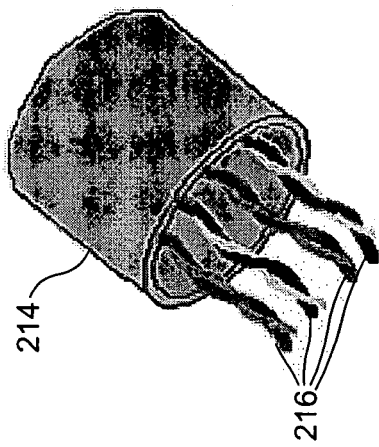
FIG. 2C-2E illustrate examples of multi-conductor twisted pair cables.
Figure 2D:
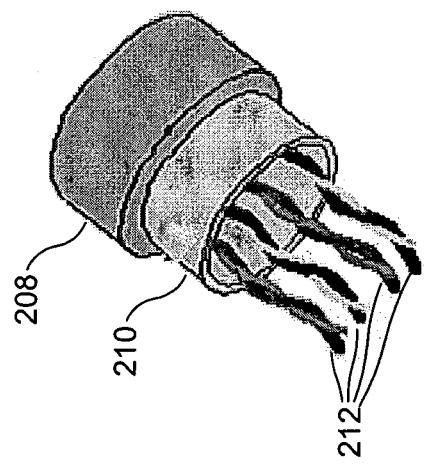
Figure 2C:
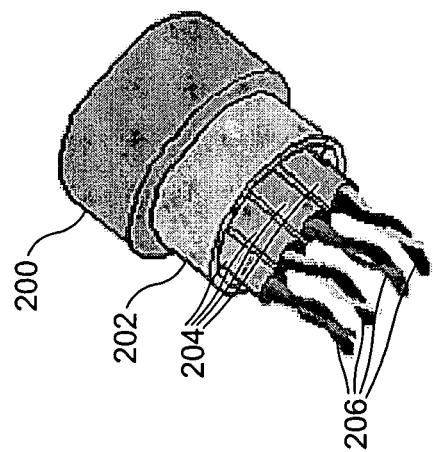

FIG. 2C illustrates a shielded twisted pair (STP) cable that has a sheath 200, an overall shield 202, and individual shields 204 for each of the four twisted pairs 206 comprising eight conductors in total. STP cables are usually used in noisy environments where individual shields 204 around twisted pairs 206, in addition to overall shield 202, protect the signals carried by twisted pairs 206 against electromagnetic interference. The overall shield 202 and individual shields 204 may be made of electrically conductive materials such as foil to reduce electromagnetic effects internal as well as external to the STP cable.

FIG. 2D illustrates a screened twisted pair (ScTP) cable that has a sheath 208, and an overall shield 210 for four twisted pairs 212 comprising eight conductors. ScTP or foiled twisted pair (FTP) is a variation of STP cables and provides lesser protection to signals carried by twisted pairs 212 as compared to an STP cable because each twisted pair does not have an individual shield.

FIG. 2E illustrates an unshielded twisted pair (UTP) cable that has a sheath 214 for the four twisted pairs 216. A UTP cable provides lesser protection to signals carried by twisted pairs 216 as compared to STP and ScTP cables because of a lack of individual or overall shields.

Figure 2G:
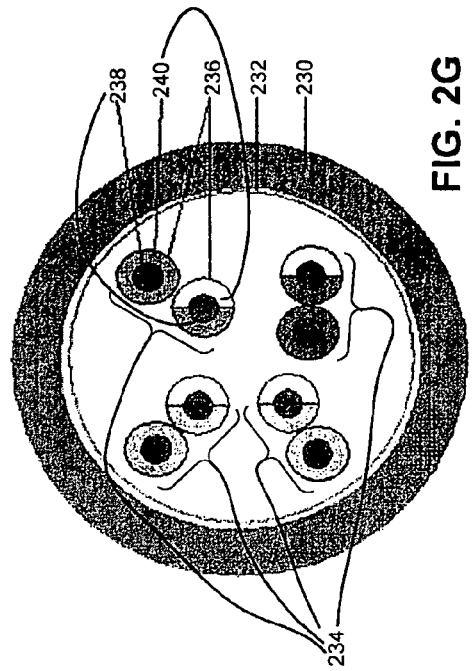
FIG. 2F-2H illustrate example cross-sections of multi-conductor twisted pair cables.
Figure 2H:
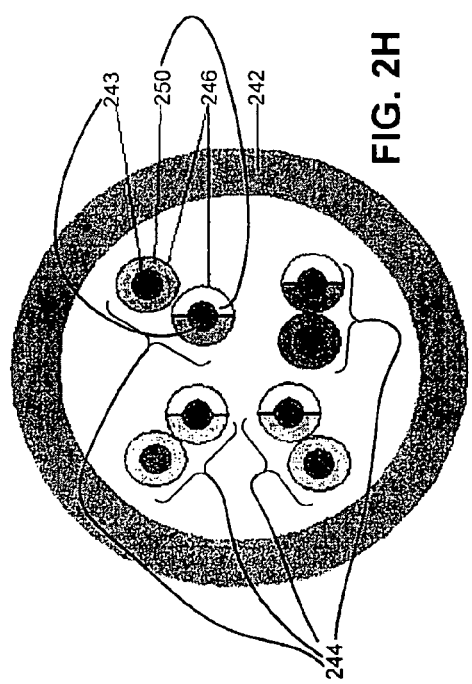
Figure 2F:
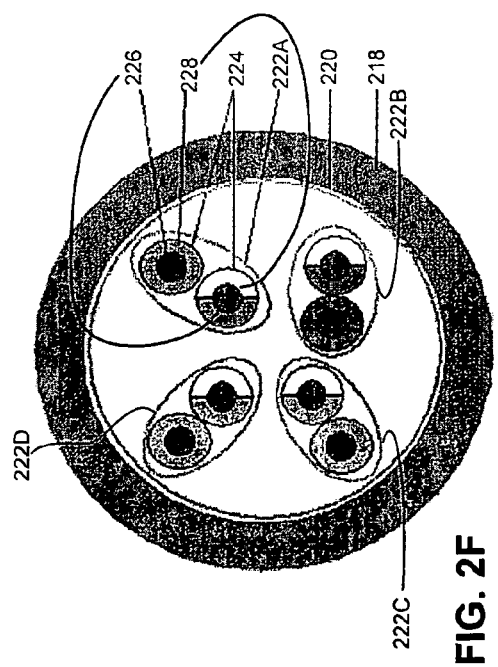

FIG. 2F illustrates a cross section of a STP cable that has a sheath 218, an overall shield 220 and individual shields 222A-D, each housing a twisted pair. For example, individual shield 222A houses twisted pair 224 which in turn comprises conductors 226 insulated by insulation 228.

FIG. 2G illustrates a cross section of a ScTP cable that has a sheath 230, an overall shield 232 and four twisted pairs 234. Example twisted pair 236 comprises conductors 238 insulated by insulation 240.

FIG. 2H illustrates a cross section of a UTP cable that has a sheath 242 covering twisted pairs 244. Example twisted pair 246 comprises conductors 243 insulated by insulation 250.

Twisted pair cables and the types of shields by them are mostly directed towards reducing EMI and increase the overall SNR of a signal transmission.

The quality of signal transmission on each twisted pair may be analyzed by measuring channel characteristics such as the SNR which is the ratio of the average signal power to the average noise power. Usually measured in decibels, SNR measures the clarity of the signal in a circuit or a wired or wireless transmission channel. The greater the SNR, evidenced by a larger number, the lesser noise there is in comparison to the desired signal strength. At an SNR of 0 dB the signal power and noise power are the same. When signals are digitized, quantization noise is one reason for limited SNR. Each extra quantization bit reduces the level of the quantization noise by roughly 6 dB.

Radio Frequency Interference (RFI) is another reason for decreased SNR in Ethernet networks. RFI results from electromagnetic radiation by electrical circuits carrying rapidly changing signals that is coupled into a transmission channel thereby causing unwanted disturbance of signals transmitted in this channel. This disturbance is also known as Electromagnetic Interference (EMI). Crosstalk is a form of EMI that commonly effects telecommunication circuitry. It is a phenomenon by which a signal transmitted on one circuit or channel of a transmission system creates an undesired effect in another circuit or channel. Crosstalk is one of the major factors that decreases SNR in an Ethernet communications system, thereby adversely affecting transmission bandwidth.

In twisted pair cabling the two conductors of each wire pair are wound around each other thereby reducing the average coupling of disturbing external electromagnetic signals into a wire pair. A larger number of twists per unit length decreases susceptibility to external interference because induced signals along a wire pair vary in sign and strength with the tendency of canceling out on average. Furthermore, shielded twisted-pair (STP) cables is less susceptible to external interference than screened twisted-pair (ScTP) cables which in turn are more immune against external interference than unshielded twisted pair (UTP) cables.

Figure 3A:
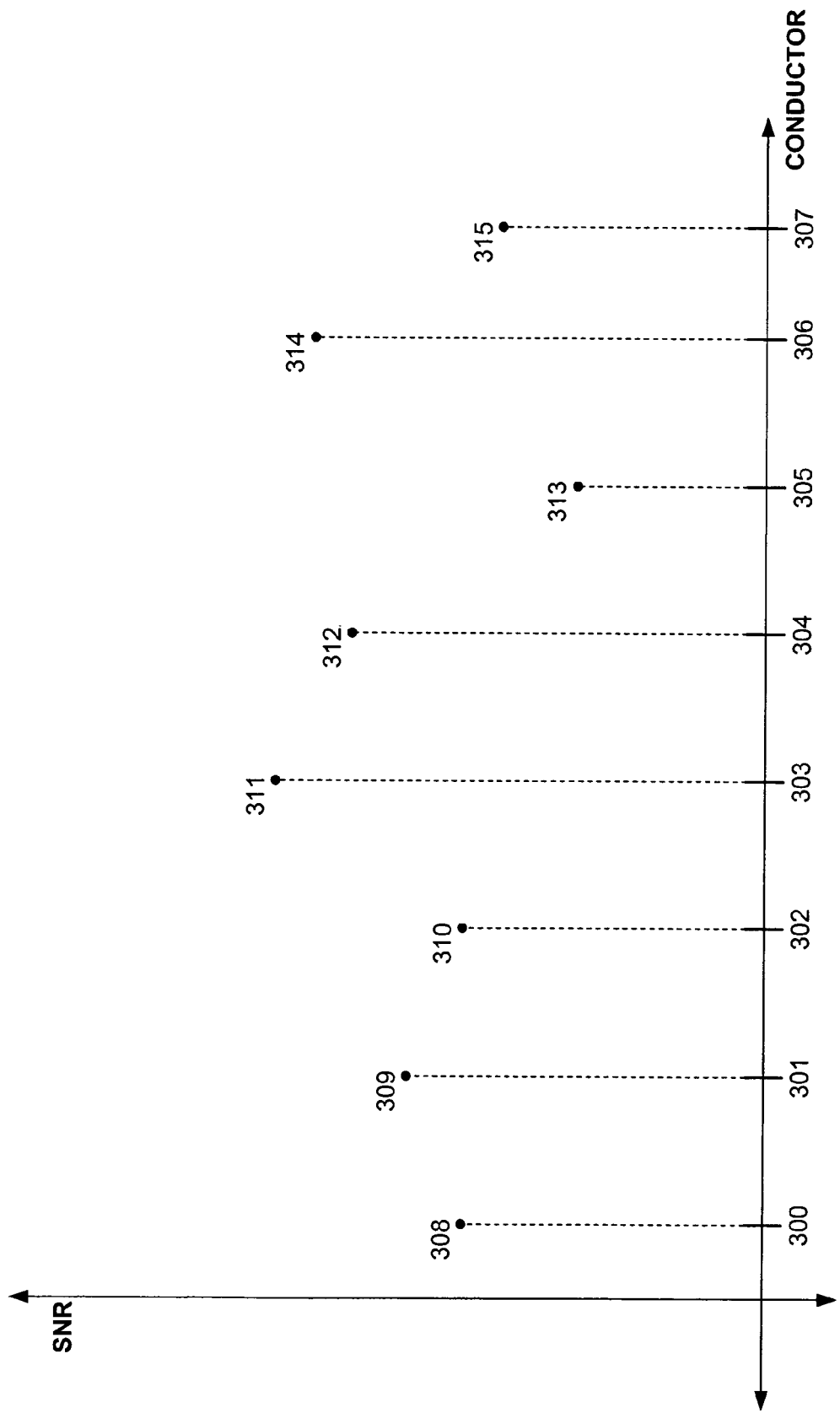
FIG. 3A illustrates example SNR values for conductors in a multi-conductor cable.

FIG. 3A illustrates example SNR values 308 to 315 for corresponding conductors 300 to 307 in a twisted pair multi-conductor cable. In this example conductor 305 has the lowest SNR 313 whereas conductor 303 has the highest SNR 311. A decrease in SNR indicates an increase in signal distortion and a reduction in the transfer rate. For multi-conductor cables, conventional Ethernet transceivers determine the maximum possible transfer rate for the conductor having the lowest SNR and transmit at the same transfer rate on all conductors irrespective of whether other conductors having a higher SNR are capable of transmitting at a higher transfer rate.

FIG. 3B illustrates example transfer rates 316 to 323 as determined by a conventional Ethernet transceiver for corresponding conductors 300 to 307 having corresponding SNR 316 to 323. In conventional Ethernet networks each conductor 300 to 307 transmits at the same data transfer rate, even though conductors 300 to 304 and 306 to 308 have higher SNRs and can transfer at a higher data rate. The transfer rate for each conductor 300 to 307 is determined based on the lowest SNR 313 corresponding to conductor 305. Thus the full available bandwidth of each conductor is not utilized thereby not optimizing the overall transfer rate.

Figure 3C:
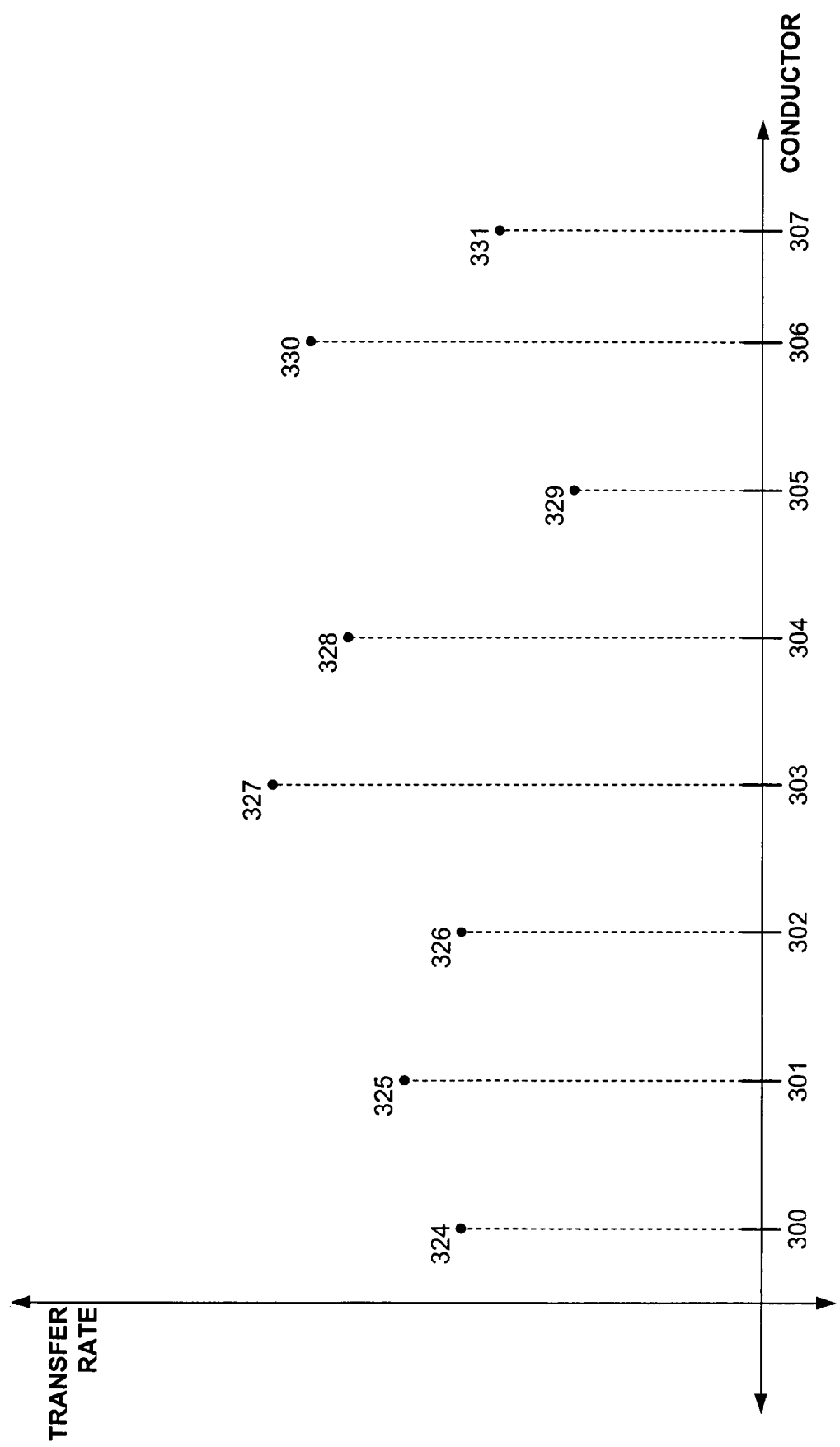
FIG. 3C illustrates example transmission rates as a function of SNR for conductors in a multi-conductor cable according to an embodiment of the invention.

FIG. 3C illustrates example transfer rates 324 to 331 for conductors 300 to 307 determined as a function of corresponding SNR 316 to 323 according to an embodiment of the invention. In this example, each conductor 300 to 307 transmits at the maximum transfer rate that its corresponding SNR 308 to 315 permits thereby optimizing the overall transfer rate.

ALTERNATE EMBODIMENTS

An embodiment of the invention dynamically adjusts transmission characteristics in real time as a function of channel characteristics. For example one or more transmission characteristics such as symbol rate, symbol size or modulation frequency may be dynamically adjusted for each conductor in a single or multi-conductor cable as a function of one or more channel characteristics for that conductor.

Figure 4:
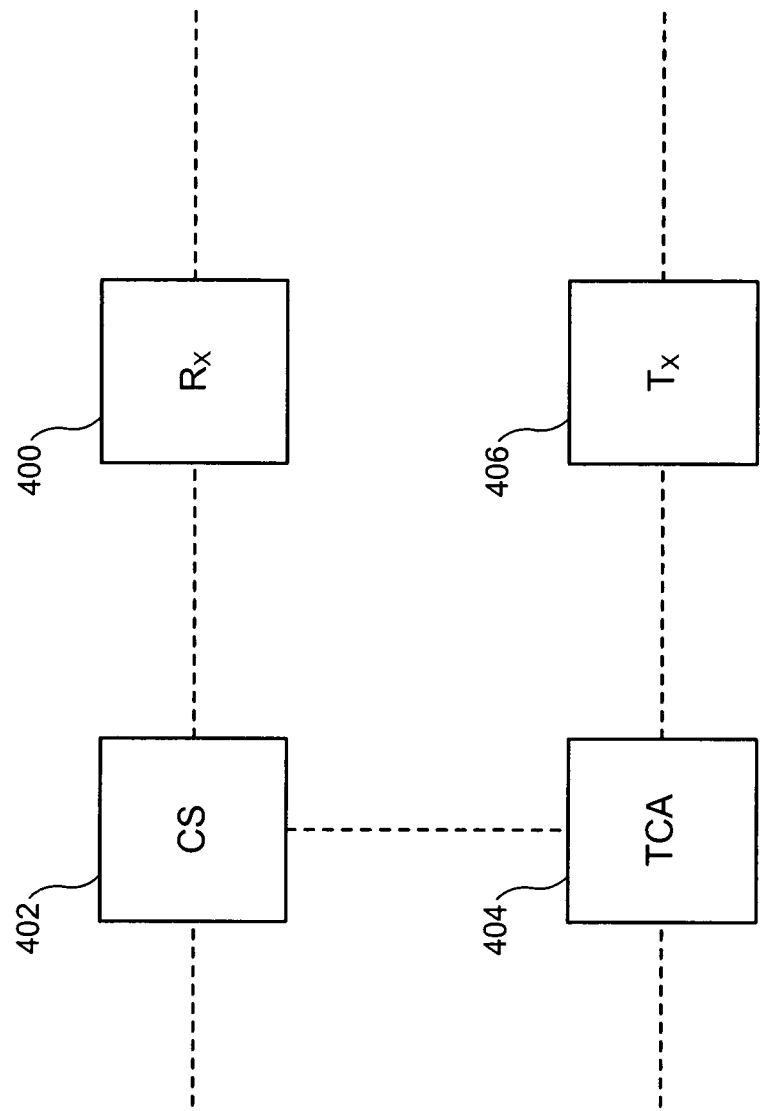
FIG. 4 illustrates an alternate embodiment of the invention.

FIG. 4 illustrates an example embodiment of the invention comprising a receiver 400, a transmitter 406, a Channel Sensor (CS) 402 and a Transfer Characteristics Adjuster (TCA) 404. Most DTEs interface to the physical medium through a transceiver via a MDI. At a minimum a transceiver comprises a transmitter 406 and a receiver 400. The transceiver is capable of monitoring the signal on a conductor as well as applying a signal to it. The receiver 400 and transmitter 406 perform the functions of a conventional transceiver. The transmitter 406 comprises a line driver applying a voltage or current corresponding to a bit stream to transmit it. The receiver 400 serves as an amplifier of Ethernet received signals. CS 402 may be directly coupled to the receiver 400 or via one or more intermediate modules such as demodulators or filters (not shown). Initially, on startup, CS 402 monitors the signal received and amplified by the receiver 400 when a connection is made between the source and destination DTEs. CS 402 determines one or more channel characteristics such as SNR for each conductors or transmission channel in use. TCA 404 may be coupled directly or via other pre-processing modules (not shown) to CS 402. TCA 404 receives channel characteristics for each conductor from CS 402 and determines if the transfer rate for each conductor as a function of its channel characteristics is optimal. TCA 404 computes the optimal transfer rate for each conductor which is transmitting above or below its optimal transfer rate as a function of its channel characteristics obtained from CS 402. TCA 404 dynamically adjusts the transfer rate for each identified conductor to the calculated optimal transfer rate and sends this information to the transmitter 406. In an embodiment, the TCA may reduce the transfer rate for a conductor if it is transmitting at a rate that is higher than that computed by CS 402. There may be one or more modules between TCA 404 and transmitter 406. Furthermore, CS 402 and TCA 404 may receive control signals from other modules in a DTE or DCE such as a processor or Direct Memory Access (DMA) unit (not shown). After the transfer rate has been adjusted to an optimal value, the signals on each conductor are periodically monitored by CS 402 for significant changes in channel characteristics. The period for monitoring the channel characteristics may be pre-programmed or wired into the circuitry or may be adjustable via a graphical user interface or firmware upgrade. If there is a significant change in channel characteristics then the process of adjusting the transfer rate for one or more of the identified conductors is repeated. Thus the transfer rate is periodically adjusted as required thereby optimizing use of available bandwidth and maintaining as high a data rate as permitted by existing channel characteristics for one or more conductors. Although the TCA 404 in the current embodiment adjusts parameters that alter transfer rates, in other embodiments TCA 404 may adjust other transfer characteristics including but not limited to parameters that alter the type or frequency of modulation and the type or amount of information transmitted.

It will be appreciated that transmitter 406 and receiver 400 along with other components of a transceiver may be modified as to provide the necessary signals to CS 402 and TCA 404. It will also be appreciated that functions of CS 402 and TCA 404 may be distributed between or combined in one or both of transmitter 406 and/or receiver 400. In an embodiment, CS 402, TCA 404, receiver 400 and transmitter 406 may be combined into a single hybrid transceiver module. Each transceiver may have one or more CS 402 and TCA 404 modules for customizing the data rate for a twisted pair. For example, a single module could customize the transfer rate for all conductor pairs. Alternatively, multiple modules could be used. The module includes functionality to determine one or more characteristics associated with a conductor pair, to determine the optimal data rate for each conductor pair based upon the determined characteristic(s), and to adjust the transfer rate, if needed, for the conductor.

Figure 5:
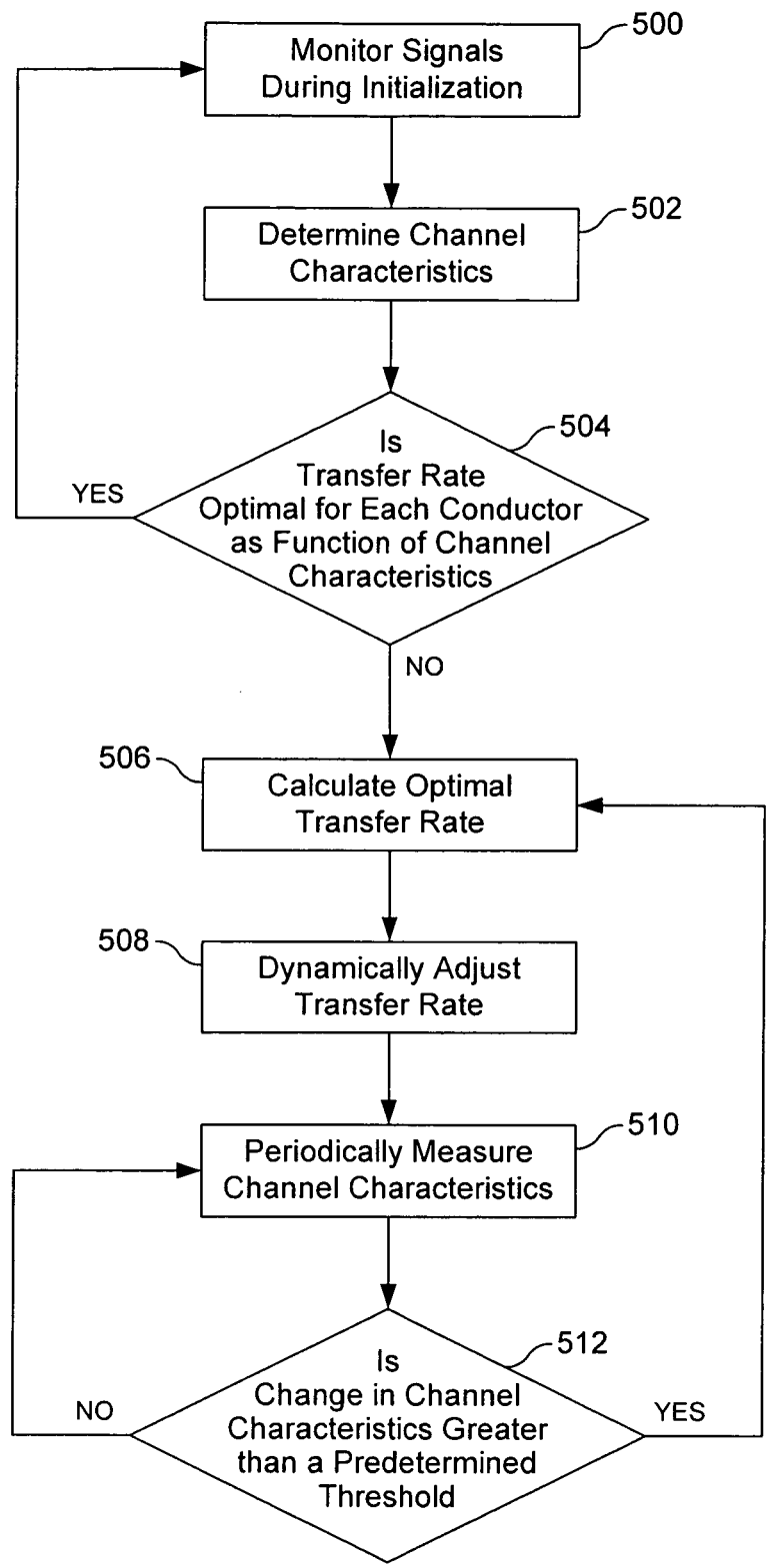
FIG. 5 is an exemplary flowchart according to an alternate embodiment of the invention.

FIG. 5 is an exemplary flowchart according to an embodiment of the invention. The steps in the flowchart may be performed by CS 402, TCA 404 or one or more hardware and software modules. These functions may also be performed in software or firmware in a DTE or DCE in the transmission path.

In step 500, the signals on each conductor in a multi-conductor cable are monitored during initialization when a connection is made between the source and the destination.

In step 502, channel characteristics for each conductor in a multi-conductor cable are determined. In one embodiment, a test signal may be sent to the destination and the corresponding reply received from the destination may be used to determine channel characteristics. In another embodiment, fields in the information packets of the signal or test signal being transmitted may be used to send or receive channel characteristics between the source and destination. For example each DTE and/or DCE between the source and destination can add signal characteristic information to the information packet.

In step 504, it is determined if each of the conductors is transmitting at a transfer rate that is optimal as function of its channel characteristics. If each conductor is transmitting at a transfer rate that is optimal as a function of its channel characteristics then the algorithm goes back to step 500 and continues to monitor channel characteristics periodically. If each conductor is not transmitting at the maximum data rate permitted by existing channel characteristics as determined in step 502, then in step 506, an optimal transfer rate as a function of channel characteristics for conductors that are not transmitting at their maximum possible transfer rate is determined. The optimal transfer rate depends on the channel characteristics and may vary in different designs. For example, in one embodiment the optimal transfer rate may be higher for a given SNR value as compared to the optimal transfer rate computed in another embodiment for the same SNR. Thus, in embodiments, the optimal transfer rate computation as a function of channel characteristics is a design characteristic.

In step 508, the transfer rate for conductors identified in step 504 is dynamically adjusted to their optimal transfer rate as determined in step 506. In embodiments, if a conductor is transmitting at a transfer rate that is greater than its optimal transfer rate as a function of its channel characteristics, then, the data transfer rate for that conductor may be lowered to its optimal data transfer rate as determined in step 506.

In step 510, the channel characteristics are periodically measured by either monitoring the data signals on each conductor or by sending a test signal at regular intervals. The periodicity of monitoring the channel characteristics may be set during initialization or at any time during transmission.

In step 512, it is determined if the absolute value of change in channel characteristics for each conductor compared to the last measurement is greater than a predetermined threshold. For example, if SNR is the measured channel characteristic then absolute value of the difference between the previous SNR value from the current SNR value will indicate the change in channel characteristics. If the change in channel characteristics is greater than the predetermined threshold then the algorithm returns to step 506. If the change in channel characteristics is lesser than the predetermined threshold then no change is made to the transfer rate and the algorithm returns to step 510 to periodically measure channel characteristics.

In an embodiment of the invention, the signals detected by a conventional transceiver may be processed by a software program with a graphical user interface to determine channel characteristics and manually or automatically adjust transmission characteristics such as transfer rates, send test signals and set thresholds to compare changes in channel characteristics. In one of the software embodiments, there is no extra hardware required as the software or firmware running on a DTE or DCE may use signals from existing transceiver hardware to perform the steps shown in FIG. 5. In another embodiment, software and hardware may be used in conjunction to implement the steps shown in FIG. 5.

Embodiments of the invention may use twisted pair cables as physical media including but not limited to examples shown in FIGS. 2C-2H. The invention is however not limited to twisted pair cables or Ethernet technology and may be applied to any media that uses wired or wireless technology for transmission. For example embodiments of the invention may be used for FireWire (IEEE 1394), Fiber Optic Inter Repeater Link (FURL) and wireless LAN (WLAN). It will be appreciated that a transfer rate can be dynamically adjusted as a function of channel characteristics for single conductor transmission cables such as coaxial cables, fibre optic cables, computer buses and even wireless transmissions channels such as those used in a WLAN.

In an embodiment using twisted pair conductors, the electrical length of the conductor pair may be determined. The electrical length is indicative of the SNR. One method for determining electrical length is for the transceiver to send out a pulse and measure the time until a reply pulse is received. As would be appreciated by persons of skill in the art, other methods for determining electrical length could be used. Additionally or alternatively, the one or more characteristics of each conductor pair can be directly measured. For example, the transceiver may directly measure the noise on each conductor pair.

Channel characteristics may be used to modify transfer characteristics other than the transfer rate, such as, the type of data being transmitted, modulation frequency etc. For example, if the SNR is low for a majority of conductors, then data other than priority data may not be transmitted until the SNR is at a predetermined level. In other examples, priority data such as headers and signal frames may be transmitted only on conductors having a high SNR.

Besides SNR and DNR, other channel characteristics may be used alone or in combination to determine the effective utilization of bandwidth in a Ethernet network conductor. One such channel characteristic is SINAD which is the abbreviation for signal-plus-noise-plus-distortion to noise-plus-distortion ratio. SINAD is calculated as the ratio of the total received power, i.e., the received signal-plus-noise-plus-distortion power to the received noise-plus-distortion power. The SINAD is usually expressed in dB.

It will be appreciated by one of ordinary skill in the relevant art(s) that the channel characteristics measured may include but are not limited to ambient noise, antenna noise, atmospheric noise, background noise, blue noise, carrier noise level, carrier-to-noise ratio (CNR), carrier-to-receiver noise density (C/kT), channel noise level, circuit noise level, closed-loop noise bandwidth, C-message weighting, cosmic noise, effective input noise temperature, equipment intermodulation noise, equivalent noise resistance, equivalent noise temperature, equivalent pulse code modulation noise (PCM), equivalent satellite link noise temperature, link quality analysis (LQA), feeder echo noise, flat weighting, FM improvement factor, FM improvement threshold, front-end noise temperature, HA1-receiver weighting, idle-channel noise, impulse noise, in-band noise power ratio, intermodulation noise, intrinsic noise, loop noise, modal noise, mode partition noise, notched noise, 144-line weighting, 144-receiver weighting, phase noise, photon noise, process gain, proration, pseudorandom noise, psophometric weighting, quantizing noise, quantum noise, quantum-noise-limited operation, random noise, received noise power, reference noise, shot noise, signal-plus-noise-to-noise ratio, signal-to-noise ratio per bit, SINAD, stereophonic crosstalk, thermal noise, total channel noise and white noise.

While these channel characteristics are related to networking and telecommunication, it should be appreciated that channel characteristics can vary according to the application. For example, when transferring data on a computer bus, channel characteristics may include but are not limited to the amount of traffic on that bus, type and number of units that are currently using the bus, the number of elements in a queue to access the bus or the memory access latency for the current transaction. These channel characteristics may be used to determine transfer characteristics for the computer bus such as which bus to use, when to transmit data and at what rate to minimize transfer latency.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 6:
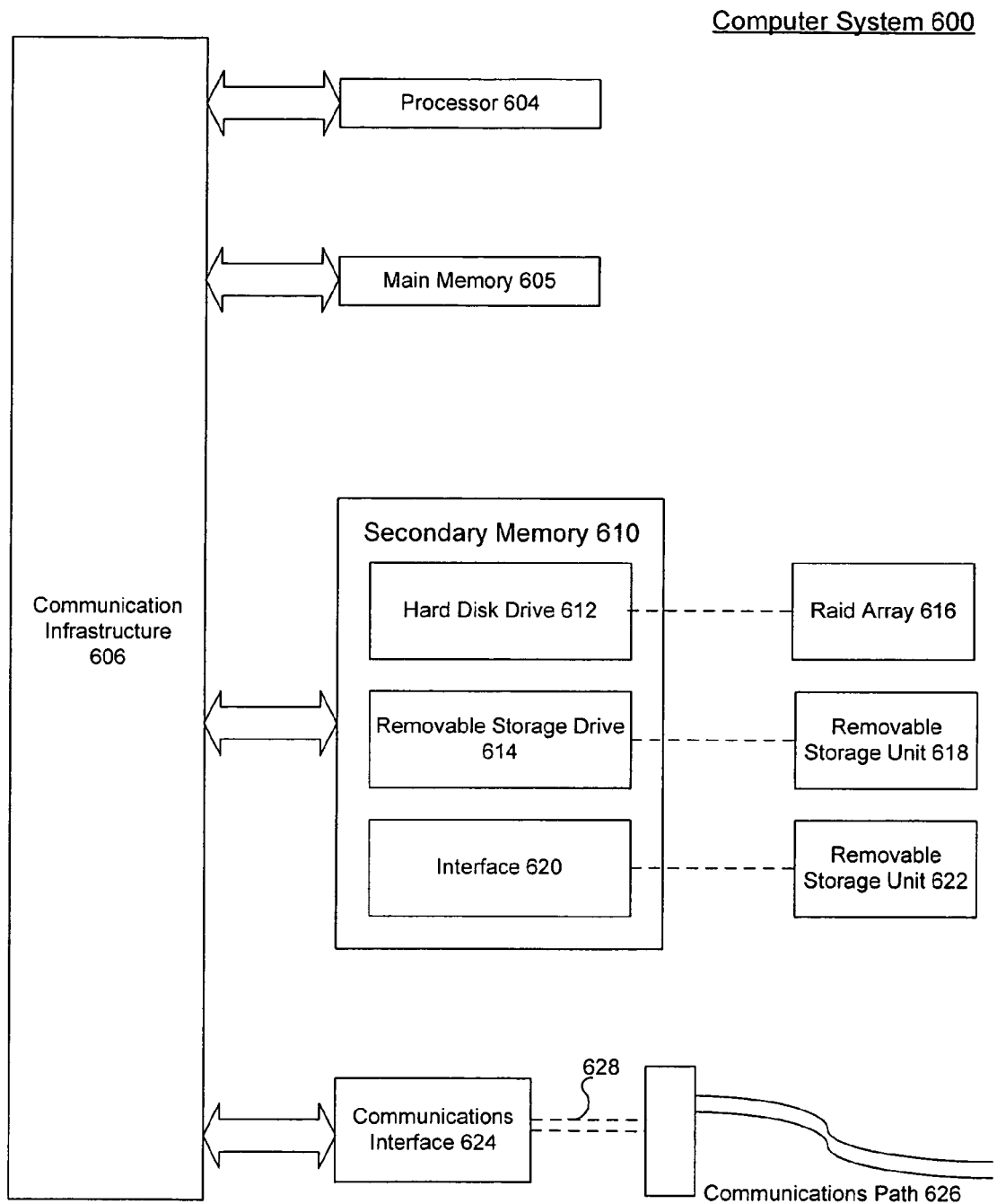
FIG. 6 is a block diagram of a computer system on which the present invention can be implemented.

The following description of a general purpose computer system is provided for completeness. The present invention can be implemented in hardware, or as a combination of software and hardware. Consequently, the invention may be implemented in the environment of a computer system or other processing system. An example of such a computer system 600 is shown in FIG. 6. The computer system 600 includes one or more processors, such as processor 604. Processor 604 can be a special purpose or a general purpose digital signal processor. The processor 604 is connected to a communication infrastructure 606 (for example, a bus or network). Various software implementations are described in terms of this exemplary computer system. After reading this description, it will become apparent to a person skilled in the relevant art how to implement the invention using other computer systems and/or computer architectures.

Computer system 600 also includes a main memory 605, preferably random access memory (RAM), and may also include a secondary memory 610. The secondary memory 610 may include, for example, a hard disk drive 612, and/or a RAID array 616, and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a floppy disk, magnetic tape, optical disk, etc. As will be appreciated, the removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a PCMCIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path 626. Communications path 626 carries signals 628 and may be implemented using wire or cable, fiber optics, a phone line, a cellular phone link, an RF link and other communications channels.

The terms "computer program medium" and "computer usable medium" are used herein to generally refer to media such as removable storage drive 614, a hard disk installed in hard disk drive 612, and signals 628. These computer program products are means for providing software to computer system 600.

Computer programs (also called computer control logic) are stored in main memory 608 and/or secondary memory 610. Computer programs may also be received via communications interface 624. Such computer programs, when executed, enable the computer system 600 to implement the present invention as discussed herein. In particular, the computer programs, when executed, enable the processor 604 to implement the processes of the present invention. Where the invention is implemented using software, the software may be stored in a computer program product and loaded into computer system 600 using raid array 616, removable storage drive 614, hard drive 612 or communications interface 624.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A method to adjust transmit data rates on a plurality of conductors in a multi-conductor cable, comprising:
   using a channel sensor, monitoring signals received on each conductor of said plurality of conductors;
   determining a Signal to Noise Ratio (SNR) for each conductor of said plurality of conductors, using the channel sensor; and
   using a transfer characteristics adjuster, adjusting a transmit data rate on a conductor of said plurality of conductors based on the corresponding SNR of the conductor when the transmit data rate for the conductor is below a predetermined threshold.

2. The method of claim 1, wherein said multi-conductor cable is a twisted pair Ethernet cable.

3. The method of claim 1, further comprising determining, using the transfer characteristics adjuster, whether the conductor is transmitting at an optimal transmit data rate as a function of its SNR.

4. The method of claim 1, further comprising calculating an optimal transmit data rate for each conductor of said plurality of conductors as a function of each conductor's corresponding SNR, using the transfer characteristics adjuster.

5. The method of claim 1, further comprising periodically measuring a change in SNR on each conductor of said plurality of conductors, using the channel sensor.

6. The method of claim 1, further comprising adjusting the transmit data rate for the conductor when a change in SNR for the conductor is greater than a second predetermined threshold.

7. The method of claim 1, further comprising increasing, with the transfer characteristics adjuster, the transmit data rate for the conductor when the SNR for the conductor is higher than a second predetermined threshold.

8. The method of claim 1, further comprising decreasing, with the transfer characteristics adjuster, the transmit data rate for the conductor when the SNR for the conductor is lower than a second predetermined threshold.

9. The method of claim 1, wherein when a first conductor of said plurality of conductors has a higher SNR than a second conductor of said plurality of conductors, then said first conductor has a higher transmit data rate than said second conductor.

10. The method of claim 1, further comprising transmitting only on conductors of said plurality of conductors that have a corresponding SNR greater than zero.

11. The method of claim 1, wherein the transmit data rate for the conductor of said plurality of conductors is adjusted without adjusting power for the conductor.

12. The method of claim 1, further comprising combining an output of each conductor of said plurality of conductors into a single combined output.

13. The method of claim 12, wherein the combined output is for a single user.

14. The method of claim 12, wherein the combined output is for a single user Ethernet system.

15. A system to adjust corresponding transmit data rates on a plurality of conductors in a multi-conductor cable, comprising:
   a receiver configured to receive signals from said plurality of conductors;
   a channel sensor coupled to said receiver and configured to determine a corresponding Signal-to-Noise Ratio (SNR) for each conductor of said plurality of conductors;
   a transfer characteristics adjuster coupled to said channel sensor and configured to calculate a corresponding transmit data rate for each conductor of said plurality of conductors as a function of the corresponding SNR for each conductor; and
   a transmitter coupled to said transfer characteristics adjuster and configured to transmit signals on each conductor at the corresponding transmit data rate calculated by said transfer characteristics adjuster;
   wherein said transfer characteristics adjuster dynamically adjusts the corresponding transmit data rate of each conductor of said plurality of conductors as a function of its corresponding SNR when the corresponding transmit data rate is below a predetermined threshold.

16. The system of claim 15, wherein the transfer characteristics adjuster adjusts a transmit data rate of a conductor of said plurality of conductors without adjusting power for that conductor.

17. The system of claim 15, wherein the plurality of conductors form a single combined output.

18. The system of claim 17, wherein the combined output is for a single user.

19. The system of claim 17, wherein the combined output is for a single user Ethernet system.

20. A method to adjust corresponding transmit data rates on a plurality of conductors in a multi-conductor cable, comprising:
   monitoring signals received on each conductor of said plurality of conductors during initialization, using a channel sensor, when a connection is made between a source and a destination;
   determining, using the channel sensor, a corresponding channel characteristic for each conductor of said plurality of conductors based on the monitoring;
   adjusting, using a transfer characteristics adjuster, a corresponding transmit data rate on each conductor of said plurality of conductors based on the corresponding channel characteristic of each conductor when the corresponding transmit data rate for the conductor is below a first predetermined threshold;
   periodically re-determining, using said channel sensor, said corresponding channel characteristic for each conductor of said plurality of conductors after said adjusting;
   determining whether a change in said corresponding channel characteristic is greater than a second predetermined threshold; and re-adjusting, using said transfer characteristics adjuster, said corresponding transmit data rate on a conductor of said plurality of conductors based on when said change is greater than said second predetermined threshold and when said corresponding transmit data rate for the conductor is below said first predetermined threshold.

21. The method of claim 20, wherein said corresponding characteristic is a Signal-to-Noise Ratio (SNR).

22. The method of claim 20, wherein said multi-conductor cable is an Ethernet cable.

23. The method of claim 21, further comprising transmitting at a higher rate on a first conductor of said plurality of conductors than a second conductor of said plurality of conductors when the first conductor has a higher corresponding SNR than the second conductor.

24. The method of claim 21, further comprising transmitting only on conductors of said plurality of conductors that have an SNR greater than zero.

* * * * *